United States Patent Office 3,444,609
Patented May 20, 1969

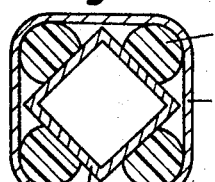
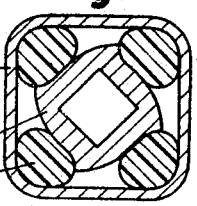
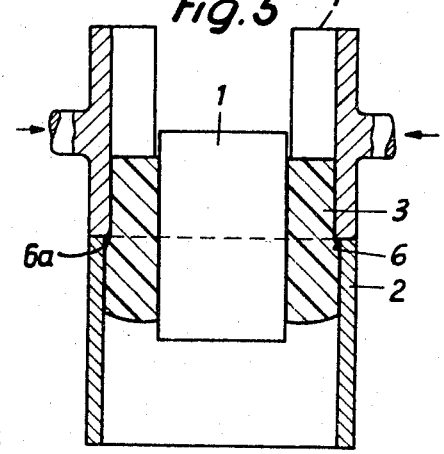
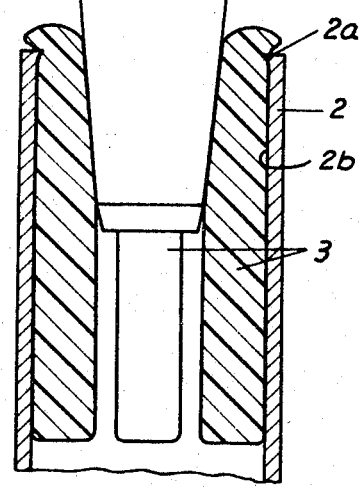
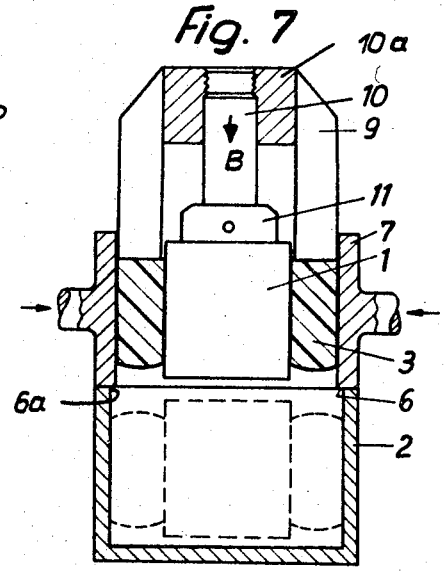
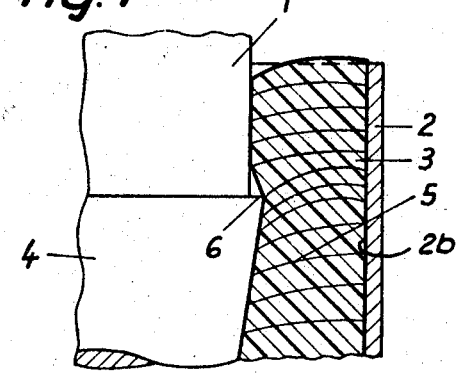
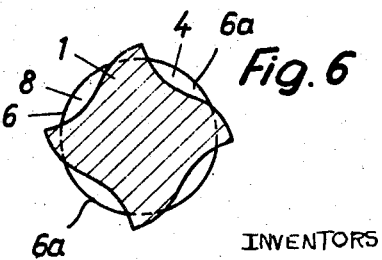

3,444,609
METHOD FOR THE ASSEMBLY OF TORSIONALLY ELASTIC CONNECTION ELEMENTS
Hermann J. Neidhart and Rico Neidhart, both of Rte. de Chancy, Genf-Bernex, Switzerland
Filed June 8, 1964, Ser. No. 373,341
Int. Cl. B23p 11/02; B23k 19/04
U.S. Cl. 29—451                                      3 Claims

ABSTRACT OF THE DISCLOSURE

A novel method for the assembly of torsionally elastic connection elements is disclosed in which, between a rigid inner component of polygonal cross-section and a rigid outer component of polygonal cross-section and enclosing said inner component, there are disposed a number of pre-stressed elastomer bodies at the same height and at a mutual spacing from one another, each elastomer body bearing at least at two inner surfaces of the polygonal outer component, said at least two inner surfaces abutting one another at an angle. The novel method comprises the steps of providing a rigid inner component of polygonal cross-section, a rigid outer component of polygonal cross-section, and a plurality of elastomer bodies. The elastomer bodies are then applied, without precompression to one of the rigid components. The elastomer bodies are simultaneously radially compressed against said one of the rigid components in a manner so as to produce a rotational stress and deformation along a direction defined by a peripheral surface of said one of the rigid components. The other rigid component is telescopically applied into a position contacting the elastomer bodies while maintaining the radial compression against said one of the rigid components.

---

The present invention relates to an improved method for the assembly of torsionally elastic connection elements incorporating a rigid inner component or portion, a rigid outer component or portion and a plurality of elastomer body members serving as spring elements arranged between the aforesaid portions with bias or pre-compression.

A number of different methods are already known for placing pre-stressed rubber bodies between rigid inner and outer portions or members. For example, it has been proposed to construct the outer member in two pieces and while introducing the rubber body to screw them together. This method is cumbersome and the connection elements manufactured in this manner are heavy, expensive and hardly usable for rotating members. As a general rule, during operation a falling-off of the working capacity is observed, based upon the fact that during assembly the bias or pre-compression is only effective along the width, however, is not able to sufficiently extend or deform the rubber rollers. The extension or deformation, that is the loss of the original shape, then takes place during the course of operation. As a result, there appears the disadvantage that either the working capacity of the elastic element at the beginning is too high and first slowly, and under circumstances, however, only insufficiently arrives at the desired value, or else, at the beginning is correct and during the course of operation becomes too small, such not being permissible. This effect is, for example fatal with vehicle suspensions, particularly with railroads having a prescribed buffer height.

It has also been proposed to insert intermediate layers, for example sheet metal, between the rubber bodies and auxiliary members which are radially pressed together for the purpose of biasing or pre-compressing the rubber bodies and then to axially press the rubber bodies together with the intermediate layers between the rigid portions of the connection elements. Also, in this case, it has been observed that the rubber bodies extend or deform during operation, causing the same disadvantages as previously mentioned during the discussion of the first prior art method.

It is also known to employ a so-called distributor as a mounting aid by means of which cylindrical rubber bodies can be inserted with bias or pre-stress in a round pipe and should be uniformly distributed. Indeed, with the distributor there is achieved a good distribution of the rubber bodies, yet generally the thus mounted elements peculiarly remain in their original position for only a short time. It has been observed without exception that the rubber bodies shift or move at their frontal face, although in appearance they appear to be completely disposed symmetrically with respect to one another. The thus resulting forces are so large that, for example, screwed-on caps or covers which should prevent the aforesaid frontal face shifting are quickly blown-off. This circumstance has shown that it is not possible to rely solely upon the symmetrical position of the rubber bodies, such is deceptive, that is, the appearance is not a suitable control means for judging the correctness of the mounting.

The previous failures during construction of torsion connection elements in which a plurality of rubber bodies are to be introduced with radial bias or pre-compression between a rigid inner portion and a rigid outer portion, so that the device also during operation continually provides with all certainty and reliability precision, that is, continuous uniform torsional energy, resides apparently in the lack of recognition that the rubber bodies for this purpose must exhibit as uniform a force distribution and force direction as possible as well as an extension or deformation of the rubber bodies adequate for operation. Consequently, up to the present neither effective methods nor suitable means have been provided for reaching this goal.

By virtue of the radial compression occurring during mounting and the thus resulting deformation of the rubber bodies which expand in the free directions, there appears in such considerable potential force moments. Such increase during operation manifold. However, it is not irrelevent where and in which direction such forces manifest themselves. If they are badly divided and/or pass one another instead of proceeding in a single plane or striving for a single common point, then the inner and outer portions due to the incorrectly stored pre-compression or initial stressing forces are forced away from their concentric position and form divergent surfaces, so that the rubber bodies in consequence of their internal stresses move more and more in the direction of the smallest resistance with each movement of the connection elements.

As previously mentioned, in order to prevent such movement recourse was made to shell constructions and to mounting aids by means of intermediates layers, since then, at least, there does not appear the feared displacement of the rubber bodies during their transition from the pre-compression or pre-stressing apparatus into the proposed position or their obstruction which causes the fatal unbalanced statics of the members in and among themselves. In so doing, the mounting of certain connection elements, particularly those with short rubber bodies, was only then occasionally properly achieved; generally however unsatisfactorily, particularly with such connection elements possessing longer rubber bodies.

Above all, no method or technique was known to the art in which there could be obtained a consistent manufacture with the necessary positive, reliable, rational and precise mounting of the connecting elements. For this reason, for example, rotary couplings with short rubber rollers became damaged in unexplainable manner often already during the first run and vehicle axes with long rubber bodies unexpectedly showed during operation a lowering of the working capacity and unpermissible inclination of the wheels, which, of course, lead to the previously indicated explanation and to the recognition of remedying means, so that in the future the success of the mounting was no longer merely left to chance.

Thus, for the execution of a faultless mounting there muts be observed that the rubber bodies during sliding or passing over from the apparatus for radial pre-stressing or biasing into their predetermined position cannot take occasion among themselves to expand disuniformly, to obstruct, or extend or deform, so that their respective potential energies, balanced or compensated during pre-compression or pre-stressing, remain balanced until completion of the transition movement, that is lie in one plane or strive for a common point. As a result, their radial stresses or bias compensate themselves in magnitude and direction, whereupon then also the tangential forces which appear during operation do not change anything; the internal force equilibrium, and thereby the connection element itself, is secured.

Such can be accomplished by appropriate construction and configuration of the parts or members from which the rubber bodies are pushed-off with respect to those in which they must remain after the transfer or transition. The passages or transition locations must be formed such that for the transfer operation they do not exhibit any obstructing or disturbing resistances or unevenness in the properties of the sliding surfaces and that the pre-compression or biasing members from which the rubber bodies are to be pushed-off exhibit smaller sliding resistance than those from which they at the start definitively bear against.

Accordingly, an important object of the present invention resides in the provision of an improved method for the assembly of torisionally elastic connection elements incorporating a rigid inner portion, a rigid outer portion and a plurality of elastomer body members arranged with bias between the aforesaid portions wherein the aforesaid torsion elements provide continuous torsional energy.

A further important object of the present invention pertains to the provision of improved method and apparatus for the assembly of torsion elements wherein the potential energy of the elastomer body members proceed in a single plane or strive for a common point.

Other features, object and advantages of the invention will become apparent by reference to the following detailed description and drawing in which there is depicted a number of illustrative embodiments of apparatus for the assembly of torsionally elastic connection elements and in conjunction with which the inventive method will be explained, with like reference numerals denoting the same or analogous elements throughout the defferent figures, and in which:

FIGURES 1 and 2 illustrate in cross-section two known torsionally elastic connection elements provided with preloaded or pre-stressed rubber bodies arranged between rigid inner and outer components or portions;

FIGURE 3 is a longitudinal sectional view through a mounting apparatus provided with an auxiliary or helping member constructed as a displacement or driving element;

FIGURE 4 is a fragmentary sectional view of the arrangement of FIGURE 3 depicting a more advanced mounting condition;

FIGURE 5 is a longitudinal sectional view taken through a further embodiment of mounting apparatus;

FIGURE 6 is a cross-sectional view taken through a profiled rigid inner portion provided with a conical displacement or driving element; and FIGURE 7 is a longitudinal sectional view taken through a third embodiment of mounting apparatus.

Describing now the drawing, FIGURES 1 and 2 illustrate, on a smaller scale than the remaining figures, cross-sections through torsion elements in which pre-stressed rubber body members are arranged between rigid outer tubes or pipes 2 and rigid inner portions or elements 1. The rubber bodies 3, when not in pre-compressed or biased condition, possess a round or nearly round cross-section. Thus, cylindrical or approximately cylindrical body members 3 under the action of pre-stressing or pre-compression assume the cross-section configuration depicted in FIGURES 1 and 2.

The apparatus or device illustrated in FIGURE 3 renders possible the assembly of connection- or spring elements in accordance with the arrangement of FIGURES 1 and 2. Naturally, in the same manner it is also possible to mount elements possessing other cross-sectional forms and more or less rubber or elastic body members. The rubber body members 3 are applied to the inner surface of the pipe or tube 2, and indeed, right from the start in that position which they also assume with finished mounted connecting element. The inner surfaces must be free of coatings such as fat an dthe like which favor sliding of the rubber body members 3. These rubber body members 3 can also temporarily be adhesively connected to the uppermost portion of the inner walls of the tube 2 or secured in another suitable manner. Generally, for securing the rubber body member 3 against axial displacement the burrs or projections 2a formed during separation of the tube or pipe 2 by means of a cutting disk or saw and appearing at the edges of the aforesaid tube 2 are sufficient, whereby it is assumed that the rubber body members 3 extend somewhat past the tube 2. Moreover, generally with short body members such are erected upon a base or support which can be provided with screws in order to precisely regulate the position and from case to case to accommodate the same, whereby the base can be removed as soon as the adhesion of the rubber body member 3 at the bearing walls of the outer portion or member 2 is secured.

A displacement or driving element 4 which tapers towards its front is arranged in front of the rigid inner member 1 to be pressed between the rubber body members 3 and which can be constructed to be detachable or integral with such inner member 1. The surface of the displacement element 4 as well as also the rigid inner portion 1 is preferably polished and wetted with a lubricant, linseed oil for example, and as generally indicated at 4a. At any rate, the friction between the members 4 and 1 and the rubber body member 3 must be smaller than the friction between the rubber body members 3 and the wall 2b of the rigid outer portion or tube 2. By virtue of pressure being applied in the direction of the arrow A upon the inner member 1 the displacement or driving element 4 is pressed through between the rubber body members 3 until the inner member 1 is located at its predetermined location, with the displacement element 4 now being below the rubber body members 3 and in the region of the tube 2, whereby the mounting is performed.

The displacement element 4 can only be so strongly wedge-shaped or coinically constructed that during pressing-in it does not by chance displace the rubber body members 3 before it, rather than deforming them in their width and length. The transition or junction location 6 between the displacement member 4 and the inner member 1 must be constructed in such a manner that, in no case does the member 1 extend past the member 4. Thus, at the location 6 there should not be either any gaps or grooves or the largest cross-section of the displacement member 4 must be at least as large and preferably larger than the cross-section of the inner member 1, as such is illustrated in FIGURES 3 and 4. It has been ascertained that the last-mentioned embodiment in which, then, the displacement member 4 at the location 6 exhibits a projection or shoulder 6a with respect to the inner member 1 is the most advantageous.

The manner of functioning of this shoulder 6a can best be realized by reference to FIGURE 4. It will be seen that the rubber body member 3, in this instance, on the one hand is located between the outer portion 2 and, on the other hand, between the displacement element 4 and the inner portion 1, to which it is ready to pass over. The structural lines 5 accordingly represent the bias or stress curve, as such can be experimentally proven with elastomer bodies. The displacement member 4 presses the rubber body member 3 against the wall 2b. The compression at the shoulder 6a is the most pronounced. Upon transgressing such shoulder 6a the rubber body member 3 experiences a considerable local expansion or stress removal in which eventually unbalanced deformations and compressions are capable of being balanced or compensated. After the high compressive stress caused by the shoulder 6a there occurs, as with a caterpillar which overcomes an obstacle during the relaxation of the hump a relative tightening, a relative tension in the rubber body member 3 which, to a certain extent, is capable of smoothing or balancing the obstructions to a uniform value.

The same operation occurs accordingly in the mounting technique depicted in FIGURE 5. In this embodiment, the rubber body members 3 are radially pressed towards the inner member 1 by means of shells or forms 7 partially encircling them and are ready to slide over from such shells 7 onto the outer portion or member 2. The transition location 6 from the shells 7 to the outer member 2 exhibits an appropriate shoulder or projection 6a over which the rubber body member 3 glide and compensate their eventual internal stress differences, as such has already been described in conjunction with FIGURE 4.

As a general rule, the cross-sectional configuration of the displacement or driving element 4 is accommodated to that of the inner member 1 and the form of the shell 7 to that of the inner edge of the outer member 2. This displacement element 4 can also, however, be a wedge-shaped structure. Such is particularly to be recommended when the inner member 1 is profiled, as illustrated in FIGURE 2 for example. Moreover, the contact surface of the tapered displacement or driving member 4 at the critical transition location 6 must extend past the contact surfaces of the inner member 1, approximately as depicted in FIGURE 6, where beneath the inner member 1 the displacement member 4 lies with its extending contact surface 8 providing the shoulder 6a. The wedge-shaped displacement element 4 has the advantage of being easy to manufcture and to provide a surface which is easy to polish and eventually absolutely uniform. It is exactly the use of such displacement elements with relatively pronounced shoulders 6a which have proven the value of these measures.

FIGURE 7 illustrates a mounting device exhibiting a bracket or frame 10a incorporating as many plungers or rams 9 as there are present rubber body members 3. The rams or plungers 9 at their front face should approximately correspond to the shape of the rubber body member 3. Furthermore, there is provided an adjusting screw 10 having a support 11 which bears against the inner member 1 in order to prevent that such inner member 1 squeezes out upwardly when downwardly pressing the plungers 9 in the direction of the arrow B. The inner member 1 together with the rubber body members 3 surrounding the same are thus pressed into the outer member 2 providing a housing closed at its bottom and, as such is depicted in dotted lines. Also, in this instance, as already described in conjunction with FIGURE 5, the rubber body members 3 are biased or pre-compressed due to radial displacement of the shells 7. In the pressed together condition there is again provided a shoulder or projection 6a at the transition location 6 between the shells 7 and the outer member 2 which performs the already mentioned compensating or balancing action upon eventual stress imbalances or inequalities appearing internally of the rubber body members 3.

Next to the angle of tapering with conical or wedge-shaped constructed displacement or driving elements 4, deciding factors for the mounting of the torsion connection elements are the shoulder means 6a, the condition or characteristics of the surfaces and the lubrication of those surfaces upon which the rubber body members must slide when pressed-in, which mounting can then be designated as faultless if, with the completed mounted elements, the internal forces of the rubber body members are completely balanced. Such is then the case if the rubber body members 3 after a series of test loads neither further expand or displace, which can be then easily determined by measurements.

While there is shown and described present preferred embodiments of the invention it is to be distinctly understood that the invention is not limited thereto but may be otherwise variously embodied and practiced within the scope of the following claims.

What is claimed is:

1. A method for the assembly of torsionally elastic connection elements in which between a rigid inner component of polygonal cross-section and a rigid outer component of polygonal cross-section and enclosing said inner component there are disposed a number of prestressed elastomer bodies at the same height and at a mutual spacing from one another, each elastomer body bearing at least two inner surfaces of said polygonal outer component, said at least two inner surfaces abutting one another at an angle, said method comprising the steps of:

providing a rigid inner component of polygonal cross-section, a rigid outer component of polygonal cross-section, and a plurality of elastomer bodies;

applying said elastomer bodies without precompression to one of said rigid components;

simultaneously radially compressing said elastomer bodies against said one of said rigid components in a manner such as to produce a rotational stress and deformation along a direction defined by a peripheral surface of said one of said rigid components; and, telescopically applying the other rigid component into a position contacting said elastomer bodies while maintaining said radial compression gainst said one of said rigid components.

2. A method as defined in claim 1, wherein said one of said rigid components is the outer rigid component and said other rigid component is the inner rigid component.

3. A method as defined in claim 1, wherein said one of said rigid components is the inner rigid component and said other rigid component is the outer rigid component.

References Cited

UNITED STATES PATENTS

| | | | |
|---|---|---|---|
| 1,739,528 | 12/1929 | Skillman. | |
| 1,772,730 | 8/1930 | Powell | 29—235 |
| 1,803,491 | 5/1931 | Thiry | 29—235 X |
| 2,329,000 | 9/1943 | Rembert | 29—235 X |
| 2,457,647 | 12/1948 | Dodge | 29—451 X |
| 2,510,206 | 6/1950 | Barkan et al. | 29—235 X |
| 2,729,442 | 1/1956 | Neidhart | 64—27 X |
| 3,208,168 | 9/1965 | Henschen | 64—27 X |
| 3,199,186 | 8/1965 | Simpson | 64—11 X |

CHARLES T. MOON, Primary Examiner.

U.S Cl. X.R.

29—235